US012141202B2

(12) United States Patent
Pohl

(10) Patent No.: US 12,141,202 B2
(45) Date of Patent: Nov. 12, 2024

(54) DETERMINING AND PUBLISHING CHANGED INFORMATION FROM DATA SOURCES TO DATA CONSUMERS

(71) Applicant: Dell Products L.P., Round Rock, TX (US)

(72) Inventor: Quinten Pohl, Naas (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/077,779

(22) Filed: Dec. 8, 2022

(65) Prior Publication Data
US 2024/0193209 A1  Jun. 13, 2024

(51) Int. Cl.
*G06F 7/00* (2006.01)
*G06F 16/901* (2019.01)

(52) U.S. Cl.
CPC ................ *G06F 16/9014* (2019.01)

(58) Field of Classification Search
CPC .......... G06F 16/1734; G06F 16/90344; G06F 16/325; G06F 16/9014
See application file for complete search history.

(56) References Cited

U.S. PATENT DOCUMENTS 5,862,325 A * 1/1999 Reed ..................... H04L 67/62
709/212
9,280,591 B1 * 3/2016 Kharatishvili .......... G06F 16/27
2005/0138081 A1 * 6/2005 Alshab ................... G06Q 10/06
2010/0100845 A1 * 4/2010 Khan ................... G06F 16/9535
715/810
2019/0108251 A1 * 4/2019 Yared .................. G06F 16/2379
2022/0374892 A1 * 11/2022 Maus .................... G06Q 20/401

OTHER PUBLICATIONS

B. M. Michelson, "Event-Driven Architecture Overview," Elemental Links Research, 5th Anniversary Edition, Feb. 2, 2011, 12 pages.
P. P. Pittalia, "A Comparative Study of Hash Algorithms in Cryptography," International Journal of Computer Science and Mobile Computing, vol. 8, No. 6, Jun. 2019, pp. 147-152.

* cited by examiner

*Primary Examiner* — Mohammed R Uddin
(74) *Attorney, Agent, or Firm* — Ryan, Mason & Lewis, LLP

(57) ABSTRACT

An apparatus comprises a processing device configured to perform a polling operation for at least one data source to obtain information for one or more designated topics of interest and to determine whether the information for a given one of the one or more designated topics of interest obtained during the polling operation comprises changed information. Responsive to determining that the information for the given designated topic of interest obtained during the polling operation comprises changed information, the at least one processing device is configured to generate one or more events comprising the changed information. The at least one processing device is further configured to publish the generated one or more events to one or more event streams, the one or more event streams being subscribed to by one or more data consumers.

20 Claims, 13 Drawing Sheets

501. POLL SERVICE

502. GENERATE HASH

GENERATE HASH FROM
RESPONSE FOR KEY
(COUNTRY:US)

507. GENERATE HASH

GENERATE HASH FROM
RESPONSE FOR KEY
(COUNTRY:US)

508. COMPARE HASH TO PREVIOUS STATE

509. DELTA DETECTED (GENERATED HASH DIFFERS FROM STORED HASH)

510. SUBSCRIBER(S) CONSUME LATEST EVENT DATA

511. TIME HAS PASSED, POLL SERVICE AGAIN

512. GENERATE AND COMPARE HASH

GENERATE HASH FROM
RESPONSE FOR KEY
(COUNTRY:US)

513. COMPARE HASH TO PREVIOUS STATE

514. NO DELTA DETECTED (GENERATED HASH MATCHES STORED HASH)

NO EVENT IS GENERATED,
NO FURTHER ACTION TAKEN

US 12,141,202 B2

DETERMINING AND PUBLISHING CHANGED INFORMATION FROM DATA SOURCES TO DATA CONSUMERS

FIELD

The field relates generally to information processing, and more particularly to management of information processing systems.

BACKGROUND

Various data consumers retrieve and process data from data sources. Such data retrieval and processing may be performed in accordance with a polling time schedule, where a data source is polled periodically by each data consumer to obtain current data from the data source. Each data consumer also determines whether there is any new information of interest available from the data source, such as by comparing current data obtained from the data source with a previous state of the data source.

SUMMARY

Illustrative embodiments of the present disclosure provide techniques for determining and publishing changed information from data sources to data consumers.

In one embodiment, an apparatus comprises at least one processing device comprising a processor coupled to a memory. The at least one processing device is configured to perform the steps of performing a polling operation for at least one data source to obtain information for one or more designated topics of interest and determining whether the information for a given one of the one or more designated topics of interest obtained during the polling operation comprises changed information. The at least one processing devices is also configured to perform the step of, responsive to determining that the information for the given designated topic of interest obtained during the polling operation comprises changed information, generating one or more events comprising the changed information. The at least one processing device is further configured to perform the step of publishing the generated one or more events to one or more event streams, the one or more event streams being subscribed to by one or more data consumers.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
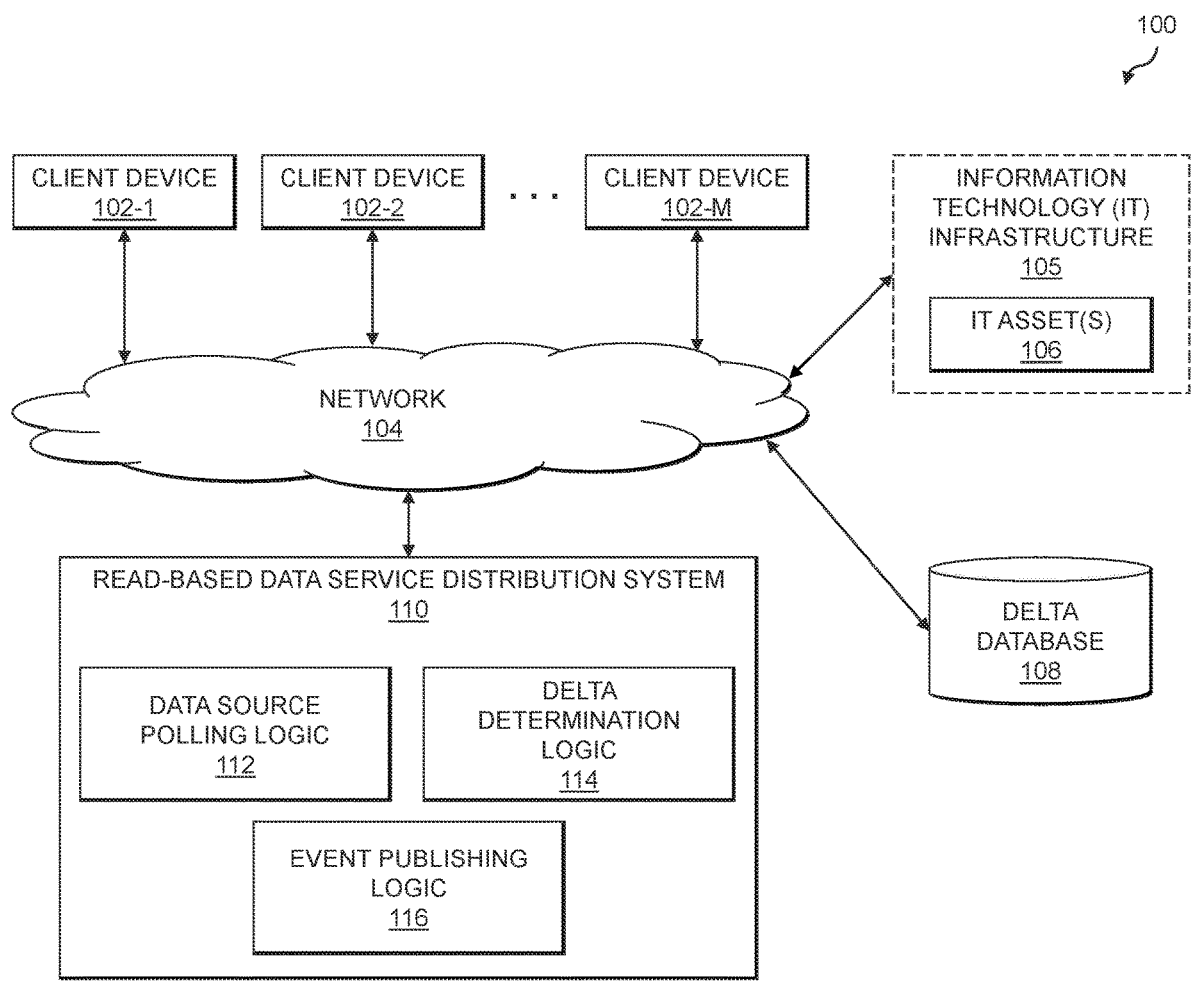
FIG. 1 is a block diagram of an information processing system configured for determining and publishing changed information from data sources to data consumers in an illustrative embodiment.

FIG. 1 shows an information processing system 100 configured in accordance with an illustrative embodiment. The information processing system 100 is assumed to be built on at least one processing platform and provides functionality for data distribution from read-based data services. The system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a delta database 108, and a read-based data service distribution system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

One or more the IT assets 106 of the IT infrastructure 105 are assumed to provide read-based data services (e.g., data sources), with one or more of the client devices 102 and/or other ones of the IT assets 106 of the IT infrastructure being subscribers of the read-based data services (e.g., data consumers). The read-based data service distribution system 110 is configured to periodically poll the read-based data services, and publish events for the data consumers when a delta is observed between the data in a current polling operation and a previous state.

In some embodiments, the read-based data service distribution system 110 is used for an enterprise system. For example, an enterprise may subscribe to or otherwise utilize the read-based data service distribution system 110 for obtaining data from read-based data services, where the read-based data services may include one or more of the IT assets 106 of the IT infrastructure 105 which are either not under the control of the enterprise system (e.g., such that an event-driven architecture for sending notifications to data consumers by raising events, also referred to herein as eventing, cannot be implemented internal to such read-based data services), or which are part of legacy systems where it would be difficult, impossible, or not practical to implement eventing functionality. Users of the enterprise system associated with the client devices 102 (or potentially other ones of the IT assets 106 of the IT infrastructure 105) can register with the read-based data service distribution system 110 in order to subscribe to data from the read-based data services, and then listen for event streams provided by the read-based data service distribution system 110 for topics of interest (e.g., identified during registration with the read-based data service distribution system 110).

As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The delta database 108, as discussed above, is configured to store and record various information that is used by the read-based data service distribution system 110 for distributing data from read-based data services to data consumers. Such information may include, but is not limited to, information regarding previous states of information polled from read-based data sources (e.g., such as hashes, keys, key-hash pairs, etc.), information associated with registration of data consumers (e.g., data topics of interest to different data consumers), etc. The delta database 108 in some embodiments is implemented using one or more storage systems or devices associated with the read-based data service distribution system 110. In some embodiments, one or more of the storage systems utilized to implement the delta database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the read-based data service distribution system 110, as well as to support communication between the read-based data service distribution system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., including performing servicing, configuration or other management of the IT assets 106, or of applications or other software that runs on the IT assets 106). For example, a given one of the client devices 102 may be operated by a user to access a graphical user interface (GUI) provided by the read-based data service distribution system 110 to register as data consumers for read-based data services provided by ones of the IT assets 106. The read-based data service distribution system 110 may be provided as a cloud service that is accessible by the given client device 102 to allow the user thereof to manage distribution of data from read-based data services (e.g., from ones of the IT assets 106 that are data sources to other ones of the IT assets 106 and/or one or more of the client devices 102 that are data consumers for the data sources). In some embodiments, the IT assets 106 of the IT infrastructure 105 are owned or operated by the same enterprise that operates the read-based data service distribution system 110 (e.g., where an enterprise such as a business provides support for the assets it operates). In other embodiments, the IT assets 106 of the IT infrastructure 105 may be owned or operated by one or more enterprises different than the enterprise which operates the read-based data service distribution system 110. Various other examples are possible.

In some embodiments, the client devices 102 and/or IT assets 106 may implement host agents that are configured for automated transmission of information (e.g., in the form of computer-generated notifications) from data sources to data consumers. Such host agents may also or alternatively be configured to automatically receive from the read-based data service distribution system 110 instructions for guiding or automating actions based on the information transmitted between the data sources and data consumers. It should be noted that a "host agent" as this term is generally used herein may comprise an automated entity, such as a software entity running on a processing device. Accordingly, a host agent need not be a human entity.

The read-based data service distribution system 110 in the FIG. 1 embodiment is assumed to be implemented using at least one processing device. Each such processing device generally comprises at least one processor and an associated memory, and implements one or more functional modules or logic for controlling certain features of the read-based data service distribution system 110. In the FIG. 1 embodiment, the read-based data service distribution system 110 comprises data source polling logic 112, delta determination logic 114, and event publishing logic 116. The data source polling logic 112 is configured to poll one or more data sources (e.g., one or more of the IT assets 106) periodically. The data sources may be polled using one or more specific "keys" corresponding to topics of interest. For example, the data source may include information for various geographic regions, with keys corresponding to specific ones of the geographic regions which are of interest to particular data consumers (e.g., with such regions of interest being determined from information stored in the delta database 108 as part of registration of the data consumers with the read-based data service distribution system 110). The delta determination logic 114 is configured to determine whether the information received from a particular data source has any new or changed information from the last time that data source was polled. To do so, the delta determination logic 114 may utilize information stored in the delta database 108 characterizing the previous state of information polled from different data sources. Such information characterizing the previous state may be, for example, a hash value (e.g., possibly a key-hash pair). Hash values stored in the delta database 108 may be compared with hash values computed for a current polling response to determine if there are any changes. The event publishing logic 116 is configured to publish events when there are changes from a current polling response to a previous state. The events may be published to event streams which are subscribed to by different ones of the data consumers (e.g., one or more of the client devices 102, one or more of the IT assets 106, etc.).

It is to be appreciated that the particular arrangement of the client devices 102, the IT infrastructure 105 and the read-based data service distribution system 110 illustrated in the FIG. 1 embodiment is presented by way of example only, and alternative arrangements can be used in other embodiments. As discussed above, for example, the read-based data service distribution system 110 (or portions of components thereof, such as one or more of the data source polling logic 112, the delta determination logic 114, and the event publishing logic 116) may in some embodiments be implemented internal to one or more of the client devices 102 and/or the IT infrastructure 105.

At least portions of the data source polling logic 112, the delta determination logic 114, and the event publishing logic 116 may be implemented at least in part in the form of software that is stored in memory and executed by a processor.

The read-based data service distribution system 110 and other portions of the system 100, as will be described in further detail below, may be part of cloud infrastructure.

The read-based data service distribution system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the delta database 108 and the read-based data service distribution system 110 or components thereof (e.g., the data source polling logic 112, the delta determination logic 114, and the event publishing logic 116) may be implemented on respective distinct processing platforms, although numerous other arrangements are possible. For example, in some embodiments at least portions of the read-based data service distribution system 110 and one or more of the client devices 102, the IT infrastructure 105 and/or the delta database 108 are implemented on the same processing platform. A given client device (e.g., 102-1) can therefore be implemented at least in part within at least one processing platform that implements at least a portion of the read-based data service distribution system 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the IT infrastructure 105, IT assets 106, the delta database 108 and the read-based data service distribution system 110, or portions or components thereof, to reside in different data centers. Numerous other distributed implementations are possible. The read-based data service distribution system 110 can also be implemented in a distributed manner across multiple data centers.

Additional examples of processing platforms utilized to implement the read-based data service distribution system 110 and other components of the system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for determining and publishing changed information from data sources to data consumers is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
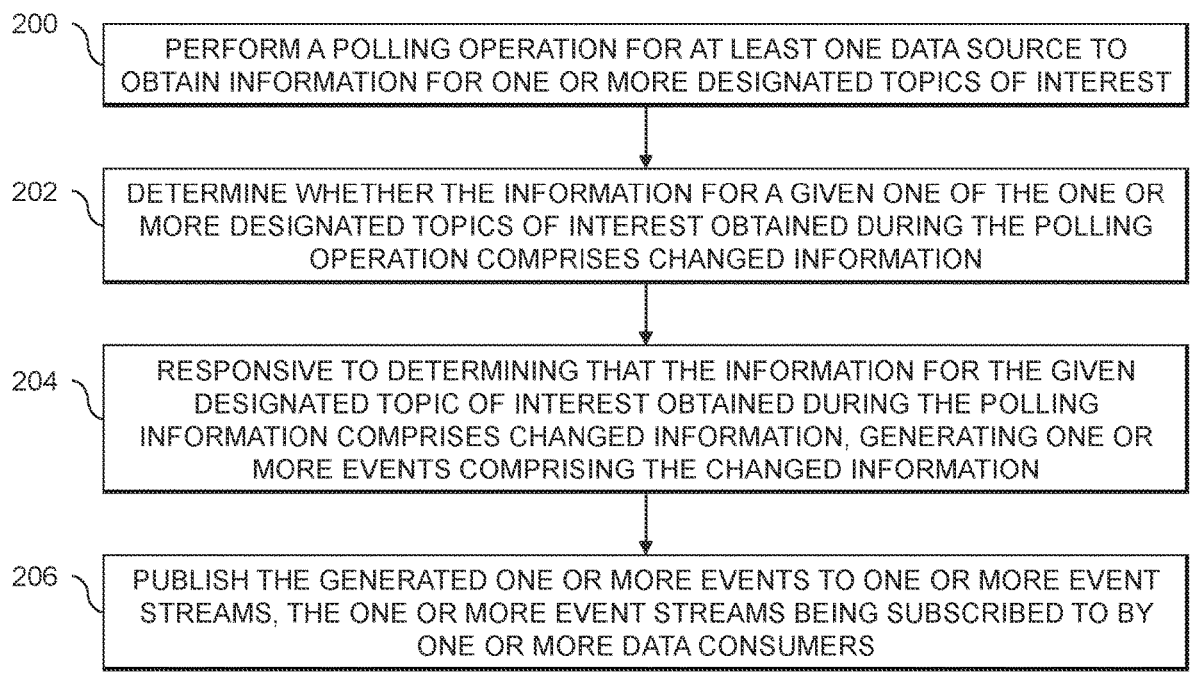
FIG. 2 is a flow diagram of an exemplary process for determining and publishing changed information from data sources to data consumers in an illustrative embodiment.

An exemplary process for determining and publishing changed information from data sources to data consumers will now be described in more detail with reference to the flow diagram of FIG. 2. It is to be understood that this particular process is only an example, and that additional or alternative processes for determining and publishing changed information from data sources to data consumers may be used in other embodiments.

In this embodiment, the process includes steps 200 through 206. These steps are assumed to be performed by the read-based data service distribution system 110 utilizing the data source polling logic 112, the delta determination logic 114, and the event publishing logic 116. The process begins with step 200, performing a polling operation for at least one data source to obtain information for one or more designated topics of interest. The one or more designated topics of interest are determined based at least in part on information obtained from the one or more data consumers during registration of the one or more data consumers.

The at least one data source may comprise a read-based data service. The read-based data service is not configured with eventing functionality for notifying the one or more data consumers of changed data for the given designated topic of interest. In some embodiments, the at least one data source is operated by a first entity, and at least one of the one or more data consumers is operated by a second entity different than the first entity. The at least one data source operated by the first entity may be outside the control of the second entity. In some embodiments, the at least one data source and at least one of the one or more data consumers are operated by a same entity. The at least one data source may be associated with a legacy system not capable of supporting eventing functionality for notifying the one or more data consumers of changed data for the given designated topic of interest.

In step 202, a determination is made as to whether the information for a given one of the one or more designated topics of interest obtained during the polling operation comprises changed information. Responsive to determining that the information for the given designated topic of interest obtained during the polling operation comprises changed information, one or more events comprising the changed information are generated in step 204. In step 206, the generated one or more events are published to one or more event streams, the one or more event streams being subscribed to by one or more data consumers.

Step 202 may comprise determining whether the information for the given designated topic of interest obtained during the polling operation is changed relative to information for the given designated topic of interest obtained during a previous polling operation performed for the data source. Step 202 may further comprise computing a first hash of the information for the given designated topic of interest obtained during the polling operation, and searching a data store for a stored second hash characterizing a previous state of information for the given designated topic of interest obtained during a previous polling operation performed for the data source. Step 202 may further comprise, responsive to finding the stored second hash corresponding to the given designated topic of interest: comparing the computed first hash to the stored second hash; and determining that the information for the given designated topic of interest obtained during the polling operation comprises changed information responsive to the computed first hash being different than the stored second hash. Step 202 may further comprise, responsive to not finding any stored second hash corresponding to the given designated topic of interest, determining that the information for the given designated topic of interest obtained during the polling operation comprises changed information. The first hash and the second hash may comprise respective MD5 hashes computed utilizing an MD5 message-digest algorithm. The stored second hash may be updated in the data store to the computed first hash responsive to determining that the computed first hash is different than the stored second hash.

Various systems deal with data retrieval and processing from read-based services. Such data retrieval and processing may be performed in accordance with a polling time schedule. This can waste bandwidth and processing resources, as each data consumer must constantly pull and process data, including in instances in which the polled data has not changed from its previous state (e.g., a previous polling operation). Additionally, with the absence of an optimal comparison of potentially large response bodies and event-based distribution when changes occur, multiple data consumers that require the same data from the same data source will waste even more resources as there are multiple entities which may be processing the same potentially unchanged data unnecessarily.

There are various use cases where data consumers integrate with data sources that are outside of the data consumers' direct influence and control, such that changes to the data sources cannot be implemented due to the data sources being owned by vendors, third parties, or where the data sources are part of legacy systems with deep dependency chains such that changes are difficult or not permitted. Such data sources are referred to herein as "read-based" data services. In such cases, the data consumers have no insight into whether data of interest from a data source has changed or not, which can lead to the above-described waste of bandwidth and processing resources, increased infrastructure costs, etc.

To optimize or improve data retrieval from read-based data services (e.g., data sources which are outside the control of data consumers), the technical solutions described herein provide a read-based data service distribution system (e.g., the read-based data service distribution system 110) that is configured to periodically poll read-based data services to determine whether any changes have occurred for different topics of interest, where the topics of interest may be associated with keys. If a delta (e.g., changed data since a last polling interval) is observed, the read-based data service distribution system will generate one or more events for one or more of the keys, with such events being consumed by downstream subscribers (e.g., data consumers).

Discovery of a delta is performed by comparing a current response for a current polling operation to a previous state (e.g., the last polling operation where a delta was found). In some embodiments, the comparison is performed using a hashing operation. The hashing operation may use a message-digest algorithm such as MD5, a secure hashing algorithm such as SHA1, SHA256, etc. Here, the MD5 algorithm may be used as security is not necessarily a concern (e.g., the hashes are used for determining whether there are differences between the current polling response and the previous state, not for cryptographic purposes). A response body for the current polling operation is used to generate a hash (e.g., an MD5 hash) for a given key, which is compared to a stored hash of a previous response body for the given key. If the generated and stored hashes differ, an event is generated. The event includes the response body and the given key, and is published in an event stream for a data topic corresponding to the given key. Data consumers will subscribe to the event stream, which ensures that the subscribers of the event stream receive data from the data source where a state mutation has occurred (e.g., when a delta is observed between the generated and stored hashes for the given key). This optimizes bandwidth and processing resources, as only one entity (the read-based data service distribution system) polls the data source.

The read-based data service distribution system polls one or more read-based data services (e.g., one or more data sources) periodically, and generates hashes of the response body for one or more keys and stores the resulting hashes. It should be noted that the response body may be divided in accordance with multiple keys, such that one response body may result in multiple hashes being stored. Consider, as an example, where a data source has data for multiple countries. Each country or group of countries of interest may be associated with its own key, such that a hash is generated and used for determining whether the response body includes new data for each country or group of countries of interest. The keys used may be based on knowledge of the data consumers. For example, data consumers may register with the read-based data service distribution system, where as part of the registration the particular data topics of interest to each data consumer is recorded. Thus, the read-based data service distribution system will know which keys are needed.

For each polling operation, the read-based data service distribution system will compare the current generated hash (for each key) with the stored hash (for each key). Should a delta occur for a given key, the read-based data service distribution system will generate events from the response for publishing to an event stream associated with a given data topic corresponding to the given key. Subscribers of the given data topic will thus be ensured to only get data events for the given key where changes have occurred, in a way that ensures optimal or improved use of bandwidth and processing resources. The event stream for the given data topic also advantageously ensures a single source of truth for up-to-date data for the given key, removing the need for multiple data consumers to poll the same data source unnecessarily.

The technical solutions described herein provide an end-to-end process for optimal or improved data distribution from read-based data services to one or more data consumers, including in cases where true eventing cannot be implemented on the read-based data service (e.g., where the read-based data service is part of a data source that is outside the control of the data consumers, where the read-based data service is part of a legacy system for which it is difficult or not practical to implement eventing, etc.). The read-based data service distribution system can read from various external data sources, and will read and hash responses from such external data sources to determine whether there are any data changes such that events or notifications should be generated. The read-based data service distribution system thus moves ownership of data change events out of the actual data sources (e.g., which may be outside the control of the entity implementing the read-based data service distribution system and/or the data consumers). The technical solutions described herein further allow for easily comparing potentially large response bodies to their previous state through comparison of hashes (e.g., MD5 hashes). Hashes generated from polling response bodies for use in comparing subsequent response bodies are used in further polling iterations. In some embodiments, the response body from a data source may include one large response with different types of content (e.g., by country or geographic region, by language, etc.). This may lead to a lot of time and resources being spent looping and checking whether any changes exist between each polling operation. Use of hashes (e.g., MD5 hashes) enables the comparison of large response bodies to be simplified and compressed.

Figure 3:
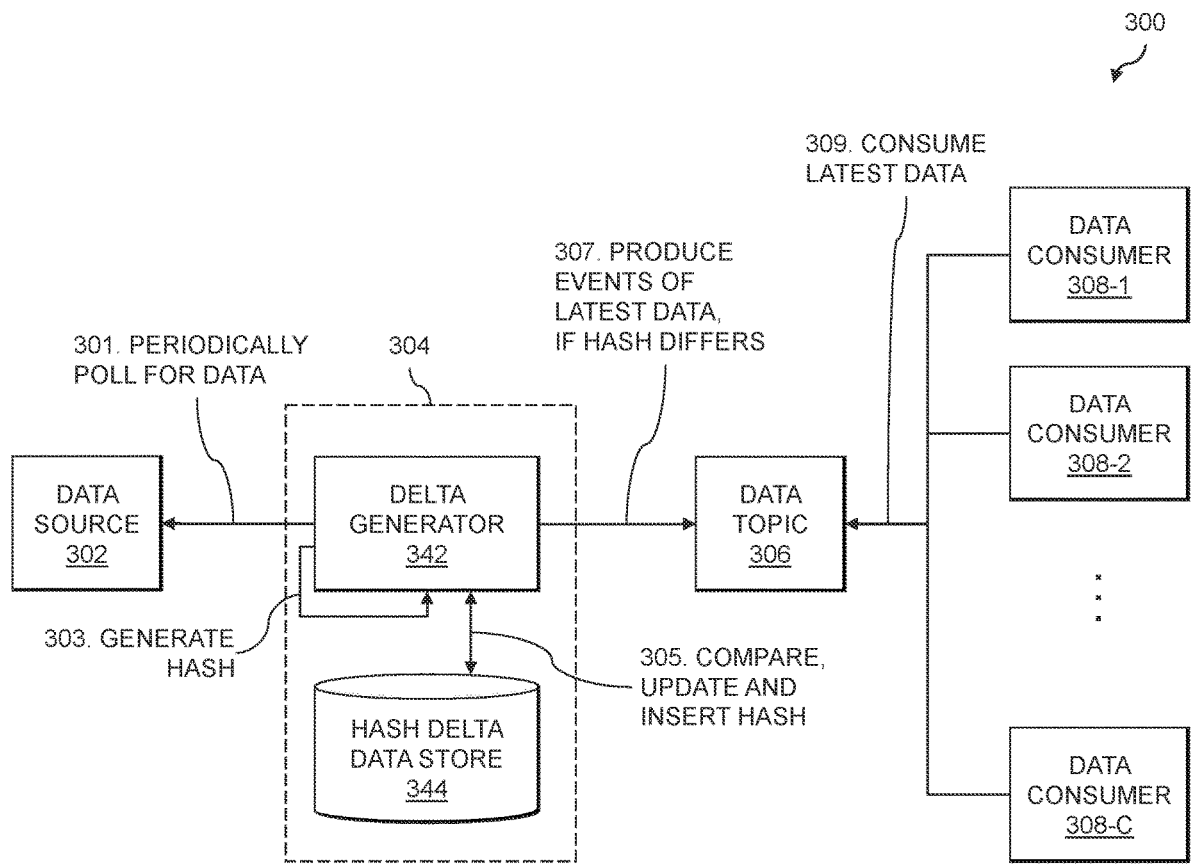
FIG. 3 shows a system configured for distribution of data from a read-based data service in an illustrative embodiment.

FIG. 3 shows a system 300, including a data source 302 (also referred to as a read-based data service or as a data service), a read-based data service distribution system 304 implementing a delta generator 342 and a hash delta data store 344, a data topic 306, and a set of data consumers 308-1, 308-2, . . . 308-C (collectively, data consumers 308). The delta generator 342 periodically polls the data source 302 for data (e.g., by key) in step 301. The delta generator 342 generates a hash (e.g., an MD5 hash) of the response body from the data source 302 for a given key in step 303. The delta generator 342 in step 305 queries the hash delta data store 344 with the given key, and "upserts" (e.g., updates and inserts) the hash value if appropriate.

When the hash delta data store 344 has an entry found for the given key, a determination is made as to whether the hash generated from the latest polling response matches the hash stored in the hash delta data store 344. If the generated hash from the latest polling response matches the stored hash, there are no changes detected and no further processing is needed. If the generated hash from the latest polling response does not match the stored hash, there are changes detected and the hash delta data store 344 is updated (e.g., with {key:hash}). When the hash delta data store 344 does not have an entry for the given key, a change is detected and an insert operation is performed (e.g., insert {key:hash}). When no change is detected, no data event will be generated. When a change is detected, one or more data events are produced or generated from the response body and are published to an event stream for the given key, represented as data topic 306, in step 307. The data consumers 308 then consume the latest data from the data topic 306 in step 309.

Figure 4:
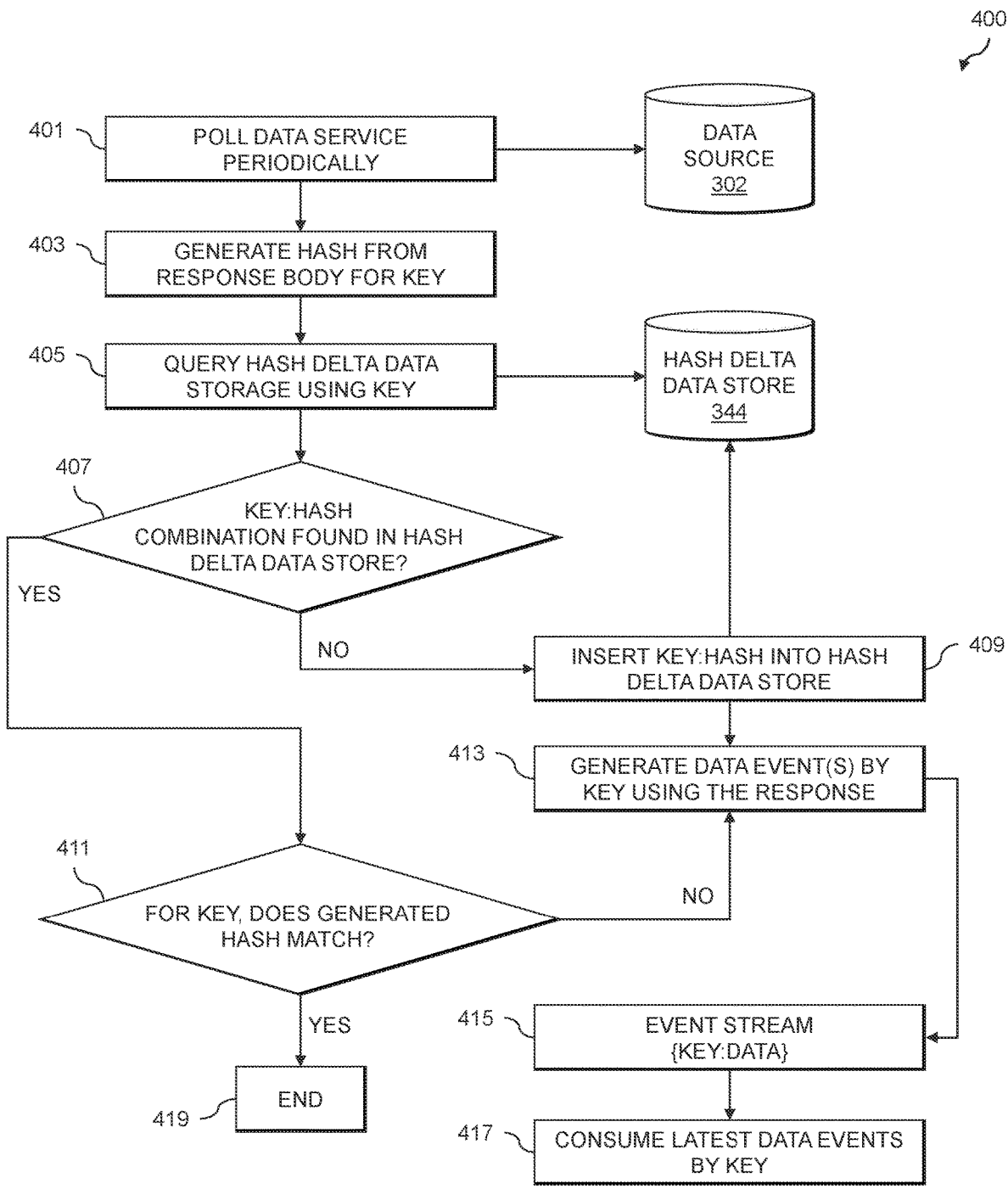
FIG. 4 shows a process flow for distribution of data from a read-based data service in an illustrative embodiment.

FIG. 4 shows a process flow 400 which may be performed using the system 300. In step 401, a data service (e.g., data source 302) is polled periodically to obtain a response body comprising source data. In step 403, the delta generator 342 generates a hash from the response body for a given key. In step 405, the delta generator 342 queries hash delta data store 344 using the given key. In step 407, the delta generator 342 determines whether an entry is found in the hash delta data store 344 for the given key (e.g., whether a key:hash combination is found in the hash delta data store 344). If the result of the step 407 determination is no, an entry (e.g., the key:hash combination) is added to the hash delta data store 344 in step 409. If the result of the step 407 determination is yes, then a determination is made as to whether the hash generated in step 403 for the given key matches the stored hash in the found entry of the hash delta data store 344 in step 411. Following step 409, and if the result of the step 411 determination is no, the process flow 400 proceeds to step 413 where one or more data events are generated, by key, using the response body. In step 415, the generated events are published to corresponding event streams (e.g., by key, such as {key:data}). Data consumers 308 in step 417 then consume the latest data events, by key, from the event streams. If the result of the step 411 determination is yes, the process flow 400 ends in step 419.

Figure 5A:
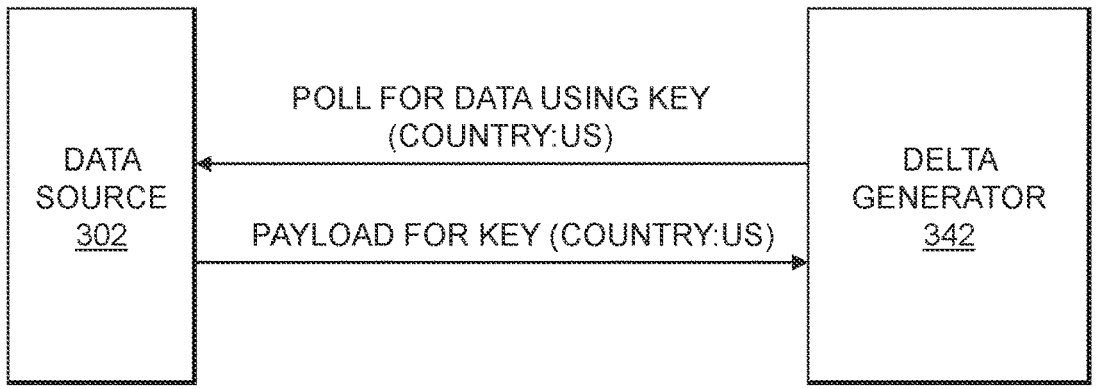
FIGS. 5A-5N show a system flow for distribution of data from a read-based data service in an illustrative embodiment.
Figure 5B:
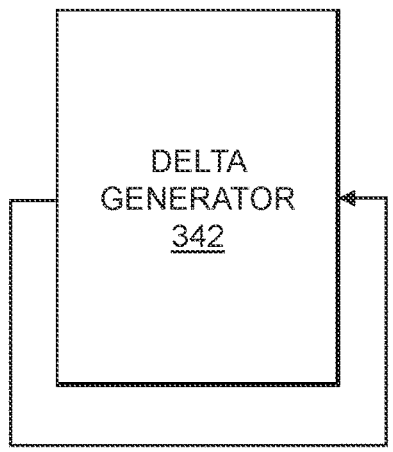
Figure 5C:
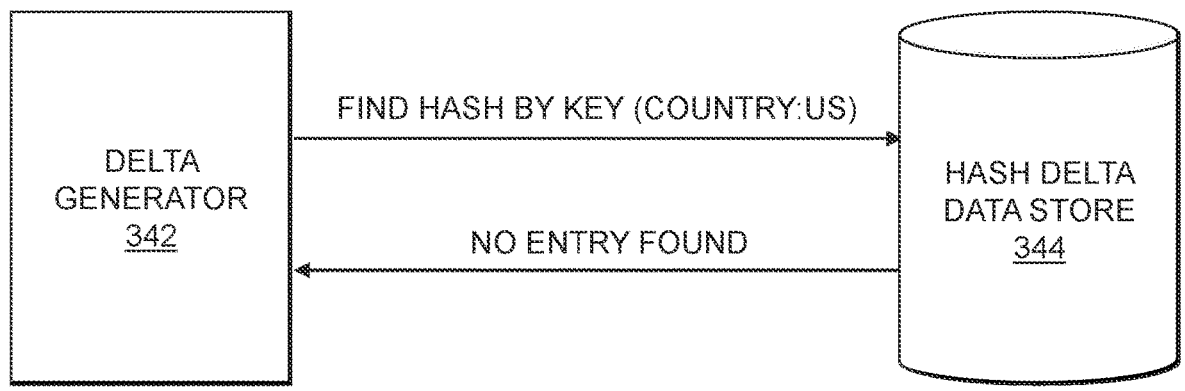
Figure 5D:
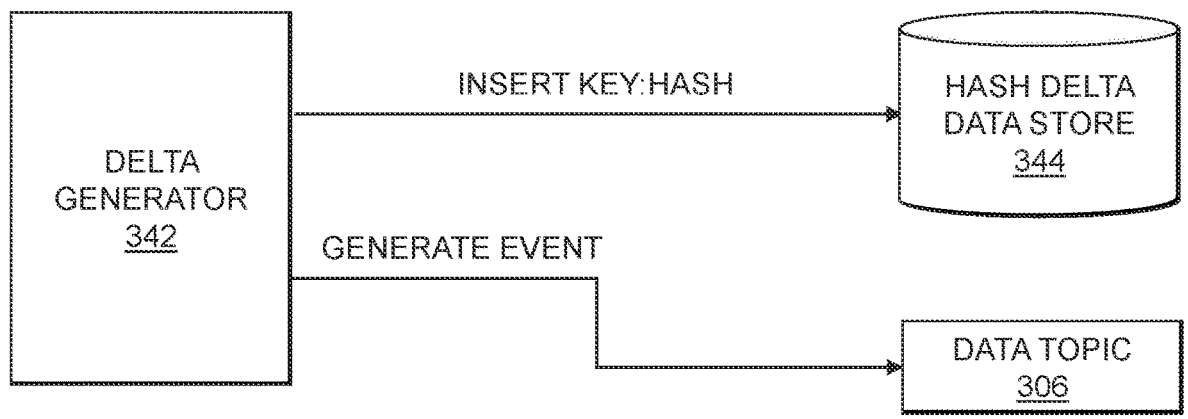
Figure 5E:
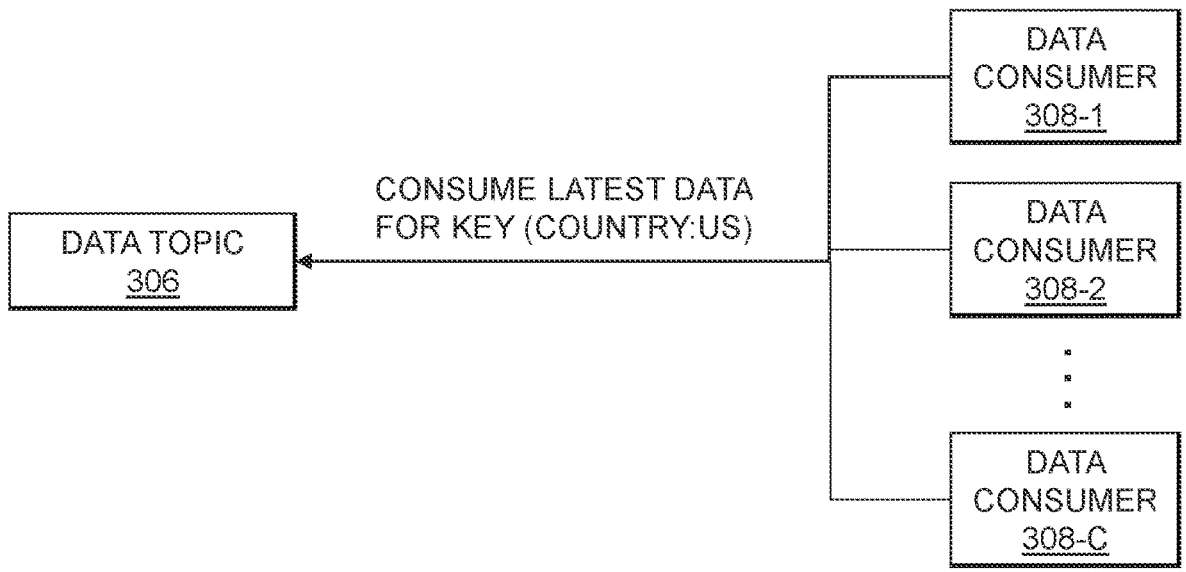
Figure 5F:
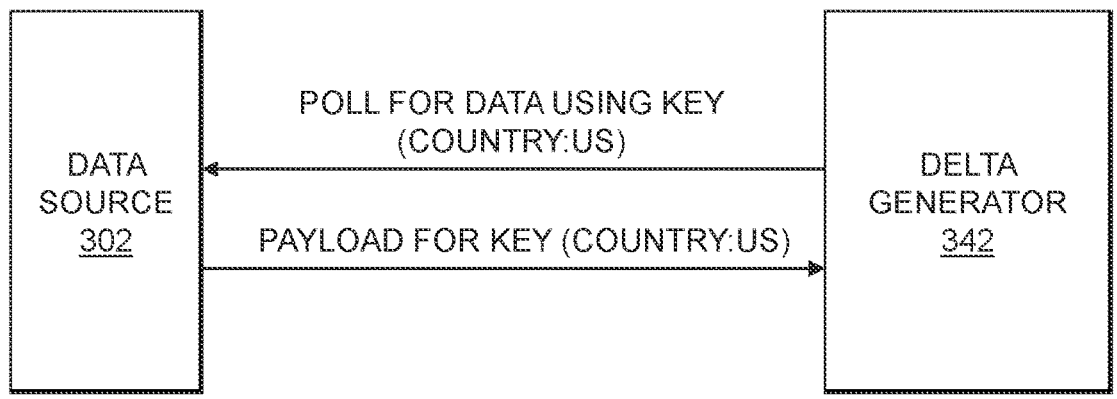
Figure 5G:
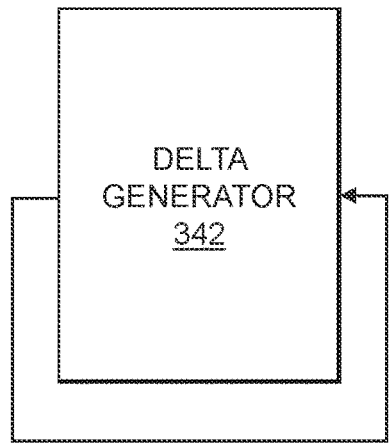
Figure 5H:
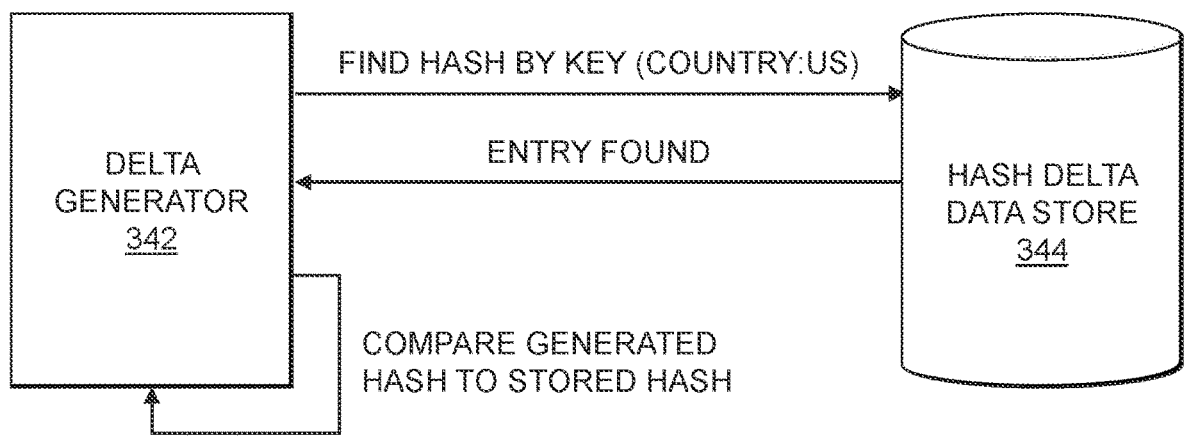
Figure 5I:
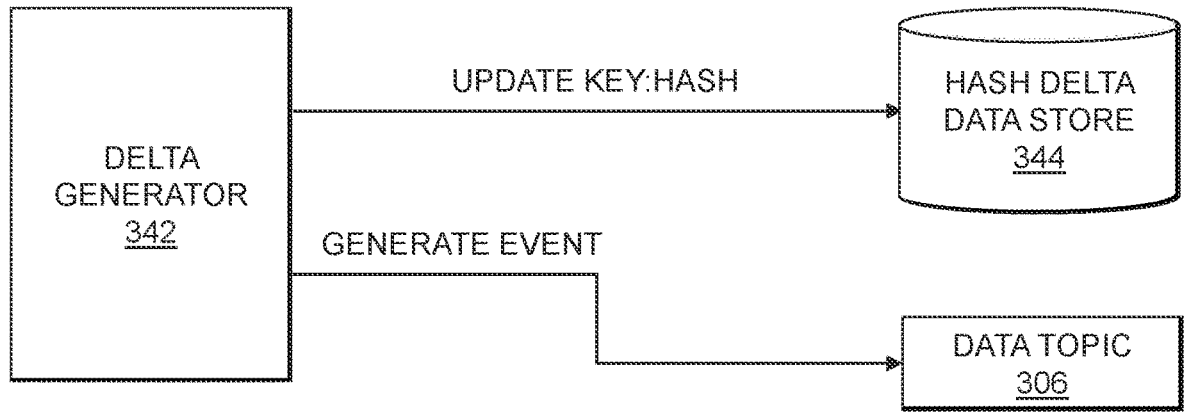
Figure 5J:
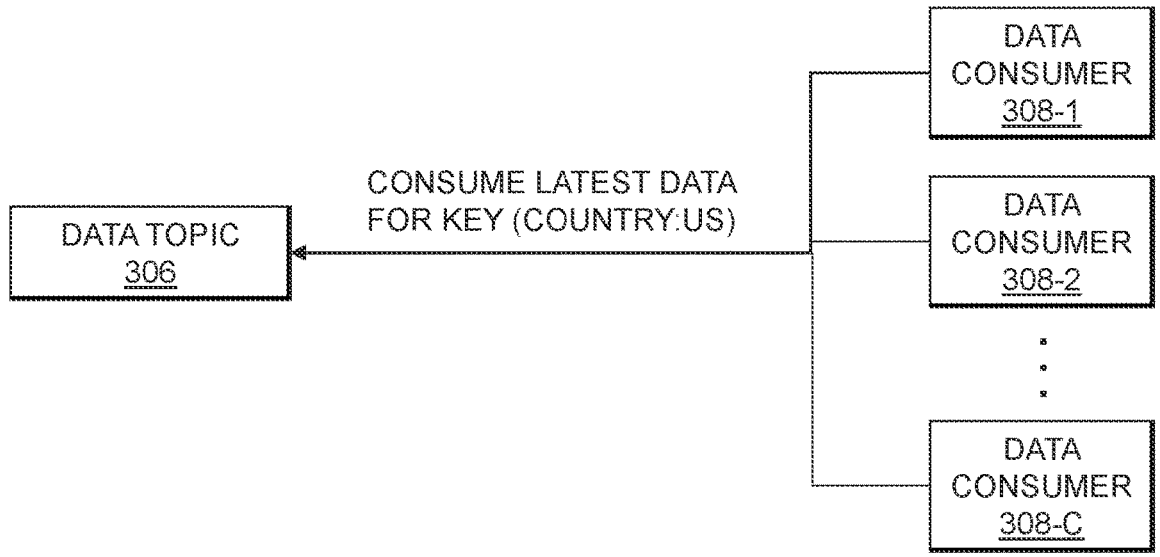
Figure 5K:
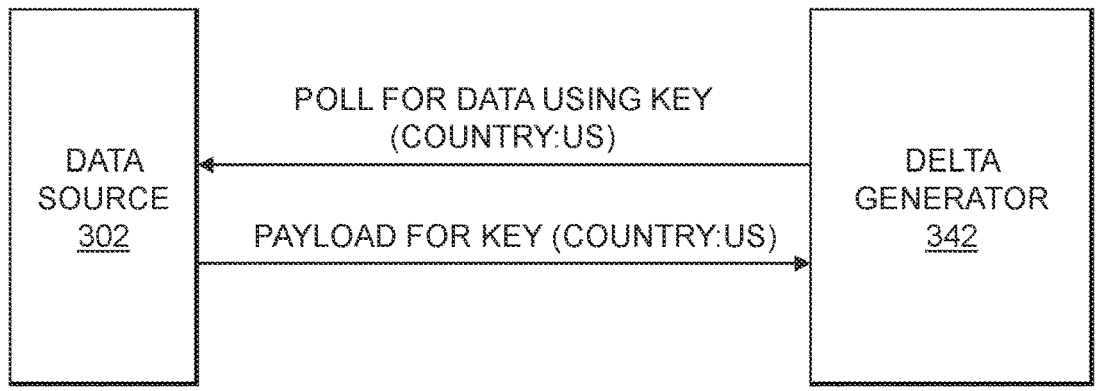
Figure 5L:
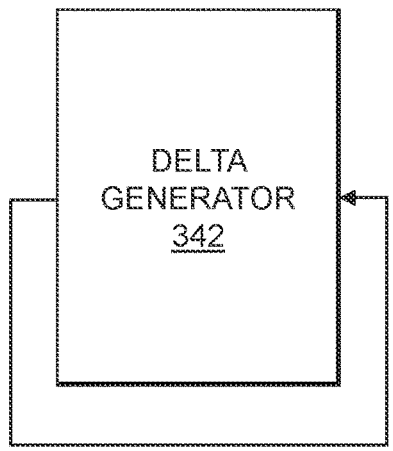
Figure 5M:
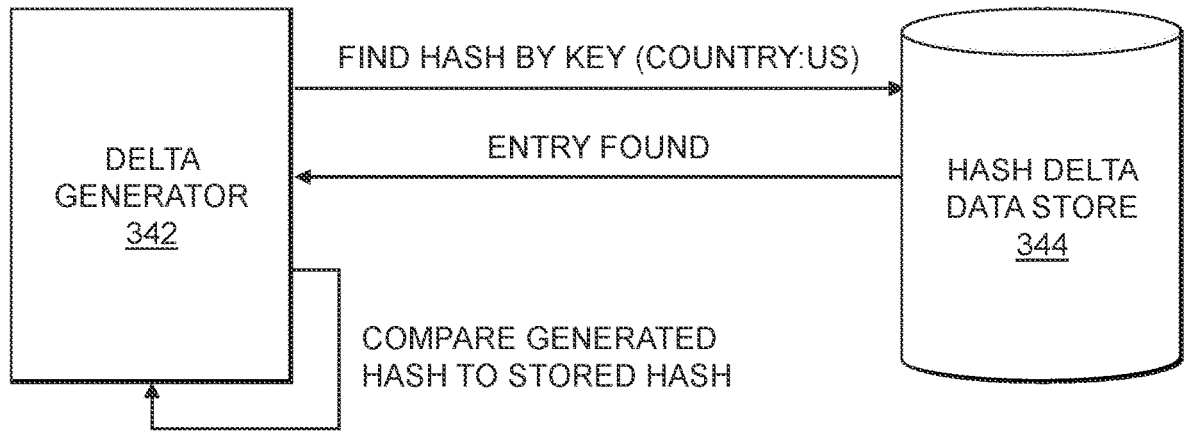
Figure 5N:
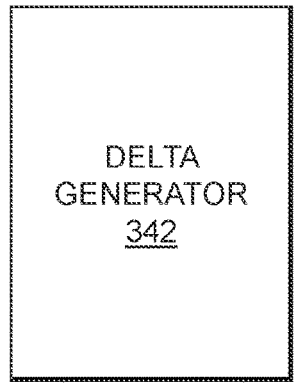

FIGS. 5A-5N shows respective steps of a system flow for distributing data from read-based data services. FIGS. 5A-5E show steps for a first polling iteration (e.g., where a delta is detected since no entry is found in the hash delta data store 344), while FIGS. 5F-5J show steps for a second polling iteration (e.g., where a delta is detected relative to an entry found in the hash delta data store 344) and FIGS. 5K-5N show steps for a third polling iteration (e.g., where no delta is detected relative to an entry found in the hash delta data store 534).

FIG. 5A shows a first step 501 of the first polling iteration where the delta generator 342 polls the data source 302. In this example, it is assumed that the delta generator 342 polls for data using a given key of (country:US). The data source 302 returns to the delta generator 342 a payload for the given key. FIG. 5B shows a second step 502 of the first polling iteration, where the delta generator 342 generates a hash of the response body (e.g., the payload) for the given key. FIG. 5C shows a third step 503 of the first polling iteration, where the delta generator 342 compares the generated hash to a previous state. This includes the delta generator 342 searching the hash delta data store 344 using the given key. Here, it is assumed that the hash delta data store 344 does not have any entry for the given key, which may be the case where this is a first polling operation for the given key. In this case where there is no existing entry, a delta is detected in the fourth step 504 of the first polling iteration as shown in FIG.

5D. Here, the delta generator 342 inserts a key:hash entry for the given key in the hash delta data store 344. The delta generator 342 also generates an event for the given key which is published to an event stream for a data topic 306 corresponding to the given key. In the fifth step 505 of the first polling iteration shown in FIG. 5E, subscribers of the data topic 306 consume the latest event data. This includes the data consumers 308 consuming the latest data for the given key from the data topic 306.

FIG. 5F shows a first step 506 of the second polling iteration where, after some designated period of time has passed, the delta generator 342 again polls the data source 302. This includes the delta generator 342 polling for data using the given key, and the data source 302 returning a response body with the payload for the given key. FIG. 5G shows a second step 507 of the second polling iteration, where the delta generator 342 generates a hash of the response body for the given key. FIG. 5H shows a third step 508 of the second polling iteration, where the delta generator 342 compares the generated hash to a previous state. This includes the delta generator 342 searching the hash delta data store 344 using the given key. Here, it is assumed that the hash delta data store 344 has an entry for the given key (e.g., the hash generated and stored during the first polling iteration). The delta generator 342 then compares the generated hash to the stored hash. FIG. 5L shows a fourth step 509 of the second polling iteration where, after a delta is detected between the generated and stored hash, the delta generator 342 updates the key:hash entry for the given key in the hash delta data store 344. The delta generator 342 also generates an event for the given key which is published to an event stream for a data topic 306 corresponding to the given key. In the fifth step 510 of the second polling iteration shown in FIG. 5J, subscribers of the data topic 306 consume the latest event data. This includes the data consumers 308 consuming the latest data for the given key from the data topic 306.

FIG. 5K shows a first step 511 of the third polling iteration where, after some designated period of time has passed, the delta generator 342 again polls the data source 302. This includes the delta generator 342 polling for data using the given key, and the data source 302 returning a response body with the payload for the given key. FIG. 5L shows a second step 512 of the third polling iteration, where the delta generator 342 generates a hash of the response body for the given key. FIG. 5M shows a third step 508 of the third polling iteration, where the delta generator 342 compares the generated hash to a previous state. This includes the delta generator 342 searching the hash delta data store 344 using the given key. Here, it is assumed that the hash delta data store 344 has an entry for the given key (e.g., the hash generated and stored during the second polling iteration). The delta generator 342 then compares the generated hash to the stored hash. FIG. 5N shows a fourth step 514 of the third polling iteration where no delta is detected between the generated and stored hash. Since no delta is detected, no event is generated and no further action is taken.

It should be appreciated that the particular sequence of polling iterations shown in FIGS. 5A-5N is presented by way of example only. For example, while FIGS. 5A-5N show an example where a delta is detected for the second polling iteration but not the third polling iteration, a delta may be detected in both the second and third polling iterations, or a delta may be detected in the third polling iteration but not the second polling iteration. Further, there may be more than three polling iterations. Various other examples are possible. Still further, while FIGS. 5A-5N show an example where the data source 302 is polled for just a single key (country:US), in other embodiments the data source 302 may be polled for multiple keys (e.g., such as country:US, country:Canada, country:France, etc.). Further, keys are not limited to being specific countries. Keys may be for groups of countries, or geographic or other subdivisions within a particular country (e.g., states, provinces, etc.). The key may also be for various other characteristics, such as by language, product or asset type, etc.

The technical solutions described herein advantageously lead to optimal or improved usage of data processing resources and bandwidth. The technical solutions described herein will further establish a scalable widely consumable event-driven source of up-to-date data. Downstream data consumers do not need to call the same data source in mass and unnecessarily process data which may not have changed. Thus, the technical solutions described herein provide significant technical advantages through simplifying and optimizing data engineering and processing methods in cases where true eventing is not achievable for a data source. This is contrast with conventional approaches which require each data consumer to separately read data from a data source for all keys of interest, and then compare the response to what is stored in a local database. There might not always be changes for all keys/responses, and hence significant time, processing resources and bandwidth may be wasted by having each data consume separately iterate through potentially unchanged data from the data source.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining and publishing changed information from data sources to data consumers will now be described in greater detail with reference to FIGS. 6 and 7. Although described in the context of system 100, these platforms may also be used to implement at least portions of other information processing systems in other embodiments.

Figure 6:
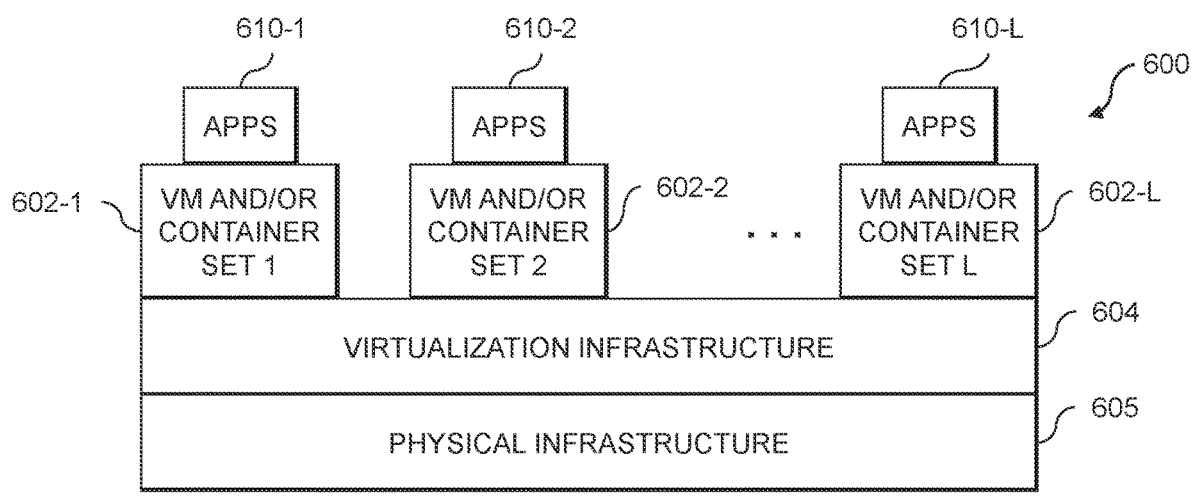
FIGS. 6 and 7 show examples of processing platforms that may be utilized to implement at least a portion of an information processing system in illustrative embodiments.
Figure 7:
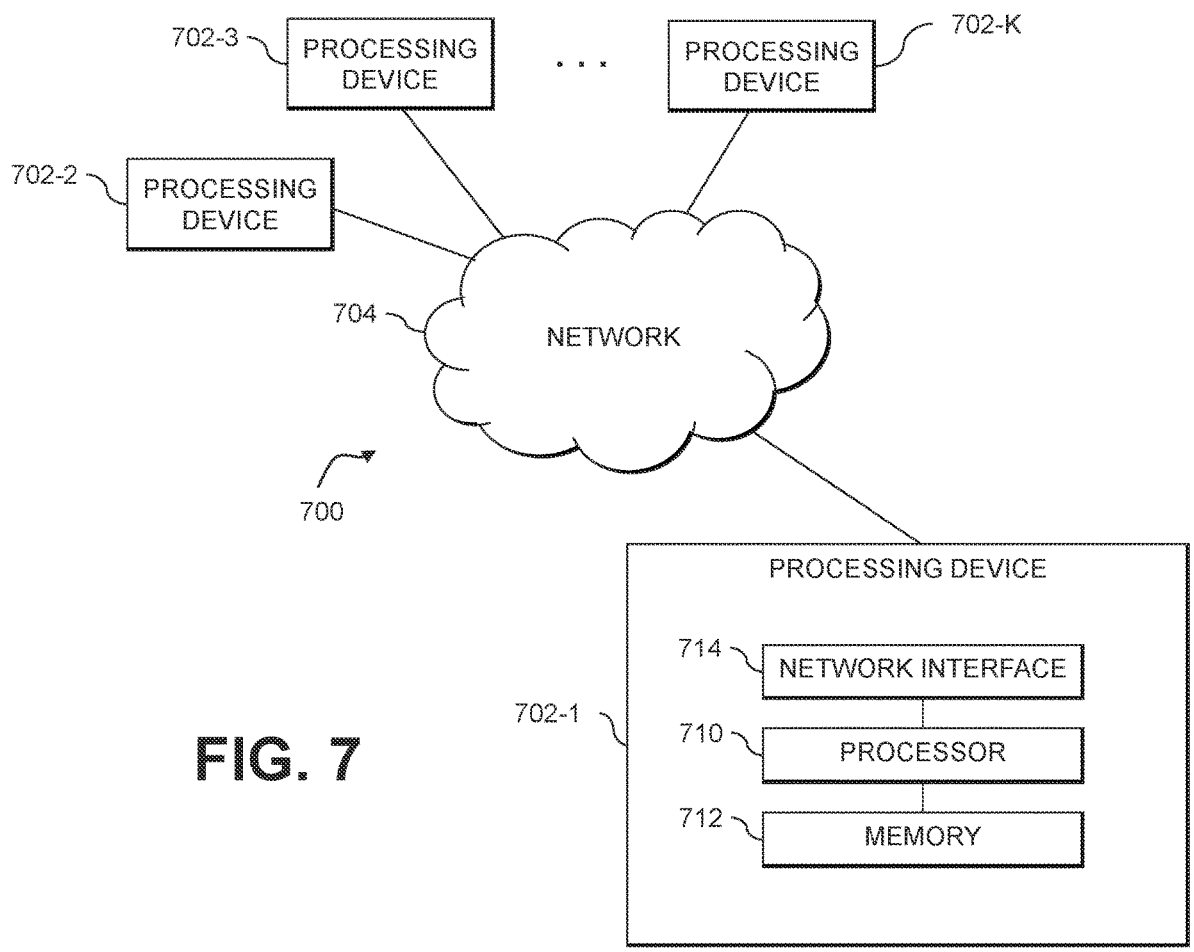

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining and publishing changed information from data sources to data consumers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, messages, notifications, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
     performing a polling operation for at least one data source to obtain information for one or more designated topics of interest;
     determining whether the information for a given one of the one or more designated topics of interest obtained during the polling operation comprises changed information;
     responsive to determining that the information for the given designated topic of interest obtained during the polling operation comprises changed information, generating one or more events comprising the changed information; and
     publishing the generated one or more events to one or more event streams, the one or more event streams being subscribed to by one or more data consumers;

wherein the one or more data consumers each comprise one or more devices that are operated by a given entity, the at least one data source being operated by an additional entity different than the given entity; and wherein the at least one data source is associated with a legacy system not configured for providing one or more notifications to the one or more data consumers in response to the changed information for the given designated topic of interest.

2. The apparatus of claim 1 wherein the at least one data source comprises a read-based data service.

3. The apparatus of claim 2 wherein the read-based data service is not configured with eventing functionality for notifying the one or more data consumers of changed data for the given designated topic of interest.

4. The apparatus of claim 1 wherein the at least one data source operated by the additional entity is outside the control of the given entity.

5. The apparatus of claim 1 wherein the legacy system is not capable of supporting eventing functionality for notifying the one or more data consumers of changed data for the given designated topic of interest.

6. The apparatus of claim 1 wherein determining whether the information for the given designated topic of interest obtained during the polling operation comprises changed information comprises determining whether the information for the given designated topic of interest obtained during the polling operation is changed relative to information for the given designated topic of interest obtained during a previous polling operation performed for the at least one data source.

7. The apparatus of claim 1 wherein determining whether the information for the given designated topic of interest obtained during the polling operation comprises changed information comprises:

computing a first hash of the information for the given designated topic of interest obtained during the polling operation; and searching a data store for a stored second hash characterizing a previous state of information for the given designated topic of interest obtained during a previous polling operation performed for the at least one data source.

8. The apparatus of claim 7 wherein determining whether the information for the given designated topic of interest obtained during the polling operation comprises changed information further comprises, responsive to finding the stored second hash corresponding to the given designated topic of interest:

comparing the computed first hash to the stored second hash; and determining that the information for the given designated topic of interest obtained during the polling operation comprises changed information responsive to the computed first hash being different than the stored second hash.

9. The apparatus of claim 7 wherein determining whether the information for the given designated topic of interest obtained during the polling operation comprises changed information further comprises, responsive to not finding any stored second hash corresponding to the given designated topic of interest, determining that the information for the given designated topic of interest obtained during the polling operation comprises changed information.

10. The apparatus of claim 7 wherein the first hash and the second hash comprise respective MD5 hashes computed utilizing an MD5 message-digest algorithm.

11. The apparatus of claim 7 wherein the stored second hash is updated in the data store to the computed first hash responsive to determining that the computed first hash is different than the stored second hash.

12. The apparatus of claim 7 wherein searching the data store for the stored second hash characterizing the previous state of information for the given designated topic of interest obtained during a previous polling operation performed for the at least one data source comprises determining a key for the given designated topic of interest and searching the data store for an entry having the determined key.

13. The apparatus of claim 12 wherein searching the data store for the entry having the determined key comprises searching for one or more key-hash pairs having the determined key.

14. The apparatus of claim 1 wherein the one or more designated topics of interest are determined based at least in part on information obtained from the one or more data consumers during registration of the one or more data consumers.

15. A computer program product comprising a non-transitory processor-readable storage medium having stored therein program code of one or more software programs, wherein the program code when executed by at least one processing device causes the at least one processing device to perform steps of:

performing a polling operation for at least one data source to obtain information for one or more designated topics of interest;

determining whether the information for a given one of the one or more designated topics of interest obtained during the polling operation comprises changed information;

responsive to determining that the information for the given designated topic of interest obtained during the polling operation comprises changed information, generating one or more events comprising the changed information; and publishing the generated one or more events to one or more event streams, the one or more event streams being subscribed to by one or more data consumers;

wherein the one or more data consumers each comprise one or more devices that are operated by a given entity, the at least one data source being operated by an additional entity different than the given entity; and wherein the at least one data source is associated with a legacy system not configured for providing one or more notifications to the one or more data consumers in response to the changed information for the given designated topic of interest.

16. The computer program product of claim 15 wherein the at least one data source comprises a read-based data service, the read-based data service not being configured with eventing functionality for notifying the one or more data consumers of changed data for the given designated topic of interest.

17. The computer program product of claim 15 wherein the legacy system is not capable of supporting eventing functionality for notifying the one or more data consumers of changed data for the given designated topic of interest.

18. A method comprising:

performing a polling operation for at least one data source to obtain information for one or more designated topics of interest;

determining whether the information for a given one of the one or more designated topics of interest obtained during the polling operation comprises changed information;

responsive to determining that the information for the given designated topic of interest obtained during the polling operation comprises changed information, generating one or more events comprising the changed information; and publishing the generated one or more events to one or more event streams, the one or more event streams being subscribed to by one or more data consumers;

wherein the one or more data consumers each comprise one or more devices that are operated by a given entity, the at least one data source being operated by an additional entity different than the given entity;

wherein the at least one data source is associated with a legacy system not configured for providing one or more notifications to the one or more data consumers in response to the changed information for the given designated topic of interest; and wherein the method is performed by at least one processing device comprising a processor coupled to a memory.

19. The method of claim 18 wherein the at least one data source comprises a read-based data service, the read-based data service not being configured with eventing functionality for notifying the one or more data consumers of changed data for the given designated topic of interest.

20. The method of claim 18 wherein the legacy system is not capable of supporting eventing functionality for notifying the one or more data consumers of changed data for the given designated topic of interest.

* * * * *